United States Patent [19]

Bellows et al.

[11] Patent Number: 5,024,582
[45] Date of Patent: Jun. 18, 1991

[54] STEAM TURBINE ROTOR HAVING GRADED WELDMENTS

[75] Inventors: James C. Bellows, Maitland; Rudolph Koubek, III, Casselberry, both of Fla.

[73] Assignee: Westinghouse Electric Corp., Pittsburgh, Pa.

[21] Appl. No.: 567,032

[22] Filed: Aug. 14, 1990

[51] Int. Cl.$^5$ .......................... F01D 1/00; F01D 25/00
[52] U.S. Cl. ............................ 416/213 R; 416/244 A; 29/889.2
[58] Field of Search ............ 416/219 R, 213 R, 241 R, 416/244 A; 29/889, 889.2; 228/226, 263.14; 219/76.12

[56] References Cited

U.S. PATENT DOCUMENTS

| 2,440,069 | 4/1948 | Bloomberg | 416/213 R |
| 3,590,454 | 7/1971 | Brass | 416/219 |
| 4,152,816 | 5/1979 | Ewing et al. | 416/241 R |
| 4,224,360 | 9/1980 | Ohnishi et al. | 219/76.12 |
| 4,633,554 | 1/1987 | Clark et al. | 29/156.4 |

FOREIGN PATENT DOCUMENTS

0113804  5/1987  Japan ................ 416/241 R

OTHER PUBLICATIONS

Clark, R. E. et al., *Experience with Weld Repair of Low Pressure Steam Turbine Rotors*, 47th American Power Conference, Chicago, Ill., printed by Westinghouse. Electric Corporation, Power Generation, Orlando, Fla.
Clark, R. E. et al., *Development of the Techniques for High Pressure Rotor Weld Repair*, Westinghouse and Mitsubishi Tech. Seminar, Takasago, Japan, Jul. 1987, proprietary document of Westinghouse.
Sermatech Review "New Services for Industrial Turbines", No. 31 (Winter, 1988).

*Primary Examiner*—Edward K. Look
*Assistant Examiner*—Hoang Nguyen

[57] ABSTRACT

This invention provides stream turbine components, such as rotor disc, which include a ring member comprising a low alloy ferrous base metal having less than about 6 wt. % alloy ingredients and a ferrous graded layer disposed on the ring member which includes a plurality of layered weldments having an increasing weight percentage of a layering metal containing Cr. Disposed on the graded layer of this invention is a Cr-containing steeple alloy disposed on the graded layer for optimizing a life extending property of the steeple region of the turbine component.

22 Claims, 2 Drawing Sheets

STEAM TURBINE ROTOR HAVING GRADED WELDMENTS

FIELD OF THE INVENTION

This invention relates to turbine and generator components employed in steam power plants, and more particularly, to methods of repairing and manufacturing low alloy steel discs and rotors to extend their useful life.

BACKGROUND OF THE INVENTION

Steam turbine and generator rotors are usually constructed of low alloy steel and contain a number of projecting steeples disposed circumferentially about a disc portion of the rotor for retaining blades. During service, these steeples can experience corrosion due to steam borne corrodants and erosion or wear due to steam and debris in the turbine environment. These damage mechanisms sometimes evidence themselves in pitting and cracking of the steeples and surrounding disc area or substantial metal wastings and can lead to scrapping the entire turbine rotor at great expense to the operator.

Recent developments in welding, such as improved alloys and low heat input welding techniques, have allowed low alloy turbine rotors to be rebuilt so that new steeples may be machined into the weldment. See Clark, et al., *Experiences with Weld Repair of Low Pressure Steam Turbine Rotors*, 47th American Power Conference, Chicago, Ill., printed by Westinghouse Electric Corporation, Power Generation, Orlando, Fla. and Clark, et al., *Development of the Techniques for High Pressure Rotor Weld Repair*, Westinghouse and Mitsubishi Tech. Seminar, Takasago, Japan, July 1987, which are both hereby incorporated by reference. Despite such useful techniques designed to avert costly scrapping of the rotor, steeples reconstructed from low alloy weldments offer little or no improvement in corrosion or wear life when subject to the same environmental conditions which caused the pitting and cracking in the original rotor.

Artisans have also made rotor repairs by cutting off a defective section of a rotor and welding on a new rotor portion. See U.S. Pat. No. 4,633,554 which is hereby incorporated by reference. Such techniques also do not inherently increase the corrosion or wear performance of the repaired rotor and can result in similar costly repairs.

Hard STELLITE coatings have also been applied to turbine rotors with plasma transferred arc welding technology. See Sermatech Review, "New Services for Industrial Turbines", No. 31, (Winter, 1989), which is hereby incorporated by reference. By melting a powder in a plasma system, a strong metallurgical bond can be applied to a turbine rotor disc which has acceptable hot gas solid particle erosion resistance. While this technique is somewhat successful in reducing corrosion, very selective corrosion attacks occur in areas where the coating breaks off. The corrosion in these exposed areas will generally be worse than the corrosion on the surface of the rotor when no coating is applied at all.

Accordingly, there is a need for a longer lasting rotor which can resist pitting and cracking in the turbine environment and which can be cost effectively manufactured.

SUMMARY OF THE INVENTION

This invention provides steam turbine rotors and similar turbine components having a ring member, for example, a disc, made of a low alloy ferrous base metal containing less than about 6 wt. % alloying ingredients, including Cr, Mo and V. Disposed on the ring member is a ferrous graded layer comprising a plurality of layered weldments disposed on top of one another. Within these layered weldments is disposed an increasing weight percentage of a layering metal containing chromium, i.e., the chromium content of the graded layer increases with the thickness of the layer. Disposed on the graded layer is a steeple region including a corrosion resistant or wear-resistant, chromium-containing steeple alloy.

Ideally, the steeple region of this invention includes a stainless steel alloy for resisting pitting and cracking during high or low temperature service. If the stainless steel steeple were welded directly to the low alloy ring member, electrochemical corrosion would occur during service. Accordingly, a composite rotor is provided in which at least the chrome content of the welded region connecting the steeple region to the ring member varies gradually to avoid creating electrochemical corrosion cells. The graded layers of this invention are therefore designed to gradually introduce Cr through the weldments.

In the preferred embodiments of this invention a stainless steel steeple region can be attached to a low alloy steel rotor with a continuously, or quasi-continuously graded weld. Preferred methods for accomplishing this result include building the steeple region entirely from stainless steel weldment on top of the graded weld or, building a graded weld and then welding a fabricated ring of steeple alloy onto the graded weld.

BRIEF DESCRIPTION OF THE DRAWINGS

The accompanied drawings illustrate preferred embodiments of the invention for the practical application of the principles thereof and in which.

DETAILED DESCRIPTION OF THE INVENTION

The present invention relates to extending the life of steam turbine and generator components, and especially disc portions of rotors, which comprise a low alloy ferrous base metal having less than about 6 wt. % alloying ingredients, including Cr, Mo and V. According to this invention, there is disposed on a ring member of the disc, a ferrous graded layer having a plurality of layered weldments in which there is disposed an increasing weight percentage of a layering metal containing Cr. Upon the ferrous graded layer is deposited a steeple region including a Cr-containing steeple alloy for optimizing a life extending property on the steeple region.

In an alternate preferred embodiment of this invention a steam turbine rotor is provided which includes a ring member comprising a low alloy steel having less than about 6 wt. % alloying ingredients, including Cr, Mo and V. The rotor further includes a graded layer of weldments disposed on the ring member which includes an increasing weight percentage of stainless steel. Disposed onto this layer is a steeple region containing a Cr-containing steeple alloy. The graded layer of this embodiment has a thickness greater than about 1.25 cm for minimizing corrosion between the ring member and the steeple region due to their different alloy chemistries.

This invention also provides a method of preparing a steam turbine rotor for optimizing a life extending property of a steeple region of the rotor by providing a ring member comprising a low alloy ferrous base metal having less than about 6 wt. % alloying ingredients including Cr, Mo and V. The method includes the step of disposing a ferrous graded layer onto the ring member. The graded layer in this method includes a plurality of layered weldments having disposed therein an increasing weight percentage of a layered metal containing Cr. A steeple region including a Cr-containing steeple material is then disposed on the graded layer to finish the build up.

Figure 1:
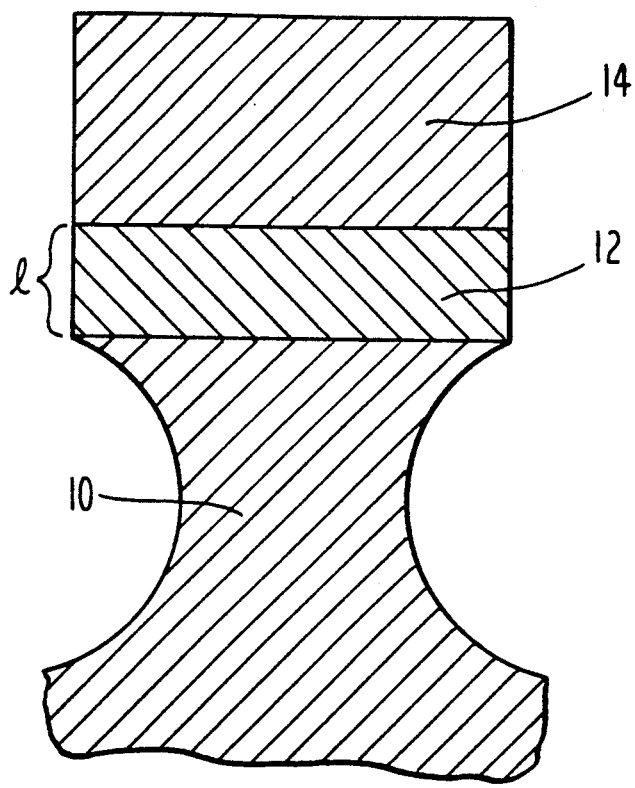
FIG. 1: is a cross-sectional view of a rotor embodiment of this invention illustrating a low alloy ring portion combined with a welded steeple region via a graded layer of weldments.

Referring now to the figures, and particularly to FIG. 1, there is shown, in cross-sectional view, the disc portion of a large steam turbine rotor made of low alloy steel having less than 6 wt. % alloying elements. The typical alloys which have been used in low pressure steam turbine rotors and generator rotors are summarized in Table I below. In addition, Cr-Mo-V low alloy steels are generally used in the high pressure section of steam turbines and are equally amenable to the processes of this invention.

TABLE I

| Component Identifications | Low Alloy Rotor Alloys | |
|---|---|---|
| | Generic Alloy Name | ASTM |
| LP Rotor | 2.5 NiMoV | A470, Class 2 |
| LP Rotor | 2.5 NiMoV | A470, Classes 3 & 4 |
| LP Rotor | 3.5 NiCrMoV | A470, Classes 5 to 7 |
| LP Disc | 3.5 NiCrMoV | A471, Classes 1 to 3 |
| LP Rotor | 2.0 NiMoV | A293, Classes 2 & 3 |
| LP Rotor | 2.5 NiMoV | A293, Classes 4 & 5 |
| LP Disc | 2.8 NiMoV | A294, Grades B & C |
| Generator Rotor | 2.8 NiMoV | A469, Classes 2 & 3 |
| Generator Rotor | 3.2 NiMoV | A469, Classes 4 & 5 |
| Generator Rotor | 3.5 NiCrMoV | A469, Classes 6 to 8 |

In the preferred process, the ring member is preferably a disc of reduced diameter made of base metal 10. In order to build the graded weld 12 of the preferred ferrous graded layer of this invention, the weld is started with a filler metal of rotor material, such as those described in Table I. Preferably after one pass, a weight percentage of greater than about 1%, preferably greater than about 3% of a layering metal containing Cr, preferably austenitic stainless steel, is added to the weld. After a second pass, another small percentage of layering metal containing Cr or stainless steel is added to the filler. With each succeeding pass, the fraction of layering metal containing Cr or stainless steel is increased until the filler is preferably 100% layering metal containing Cr or stainless steel. Preferably, the layering metal of the graded weld 12 contains at least about 2 wt. % Cr to improve wear resistance and at least 12% Cr to improve corrosion resistance of the steeple 20. Typical austenitic stainless steel compositions useful in connection with this invention are listed in Table II below, although other suitable corrosion resistant stainless steels will also be suitable for this purpose.

TABLE II

| | Austenitic Stainless Steels Nominal Composition, % | | | | | | | |
|---|---|---|---|---|---|---|---|---|
| Type | Carbon | Manganese | Phosphorus | Sulfur | Silicon | Chromium | Nickel | Molybdenum |
| 301 | 0.15 | 2.0 | 0.045 | 0.03 | 1.00 | 17.0 | 7.0 | — |
| 302 | 0.15 | 2.0 | 0.045 | 0.03 | 1.00 | 18.0 | 9.0 | — |
| 304 | 0.08 | 2.0 | 0.045 | 0.03 | 1.00 | 19.0 | 9.3 | — |
| 304L | 0.03 | 2.0 | 0.045 | 0.03 | 1.00 | 19.0 | 10.0 | — |
| 309 | 0.20 | 2.0 | 0.045 | 0.03 | 1.00 | 23.0 | 13.5 | — |
| E309 | 0.08 max | 1.25–2.50 | 0.030 | 0.03 max | 0.50 | 10.5–25.0 max | 12.5–14.0 | — |
| 310 | 0.25 | 2.0 | 0.045 | 0.03 | 1.50 | 25.0 | 20.5 | — |
| 314 | 0.25 | 2.0 | 0.045 | 0.03 | 2.00 | 24.5 | 20.5 | — |
| 316 | 0.08 | 2.0 | 0.045 | 0.03 | 1.00 | 17.0 | 12.0 | 2.5 |
| 316L | 0.03 | 2.0 | 0.045 | 0.03 | 1.00 | 17.0 | 12.0 | 2.5 |
| 317 | 0.08 | 2.0 | 0.045 | 0.03 | 1.00 | 19.0 | 13.0 | 3.5 |
| 321 | 0.08 | 2.0 | 0.045 | 0.03 | 1.00 | 18.0 | 10.5 | — |
| 347 | 0.08 | 2.0 | 0.045 | 0.03 | 1.00 | 18.0 | 10.5 | — |
| 348 | 0.08 | 2.0 | 0.045 | 0.03 | 1.00 | 18.0 | 11.0 | — |

Weld repair or original equipment manufacturing of both high temperature and low temperature alloy rotors or generator rotors can be accomplished with this invention. Stainless steel-low alloy steel mixtures can be welded by blending two filler wires in continuously varying proportions by changing the relative feed rates so that each pass of weld is only slightly different from the preceding pass. In a preferred quasi-continuous variation of this technique, a collection of filler wires could be used, with indexing after a fixed number of passes. From a grading point of view, the smaller the size of the compositional steps, the better the overall effect in minimizing electrochemical cells.

Welding techniques suitable for the purpose of this invention include narrow gap, gas metal arc, submerged arc and gas tungsten arc welding techniques. The preferred technique is gas tungsten arc welding, since it can provide controlled inter-pass temperatures and relatively defect-free weldments. In this regard, the following gas-tungsten-arc-welding (GTAW or TIG) welding procedures are most preferred for depositing the graded layer and/or steeple regions of this invention.

TABLE III

| GTAW Basic Parameters | |
| --- | --- |
| Amps | 150-180 |
| Volts | 20-25 |
| Gas Flow | 15 CFM |
| Filler Wire Diameter | 3/32 |
| Shielding Gas | Argon 99.8% |
| Electrode - Tungsten | 2% thor. |

Reference is also made to T. B. Jefferson and G. Woods, "Metals and How to Weld Them", James F. Lincoln Arc Welding Foundation, 2nd Edition (1983); and *Metals Handbook*, Volume 6, "Welding, Brazing and Soldering, 9th Edition ASM (1983), which are hereby incorporated by reference in their entirety.

Figure 3:
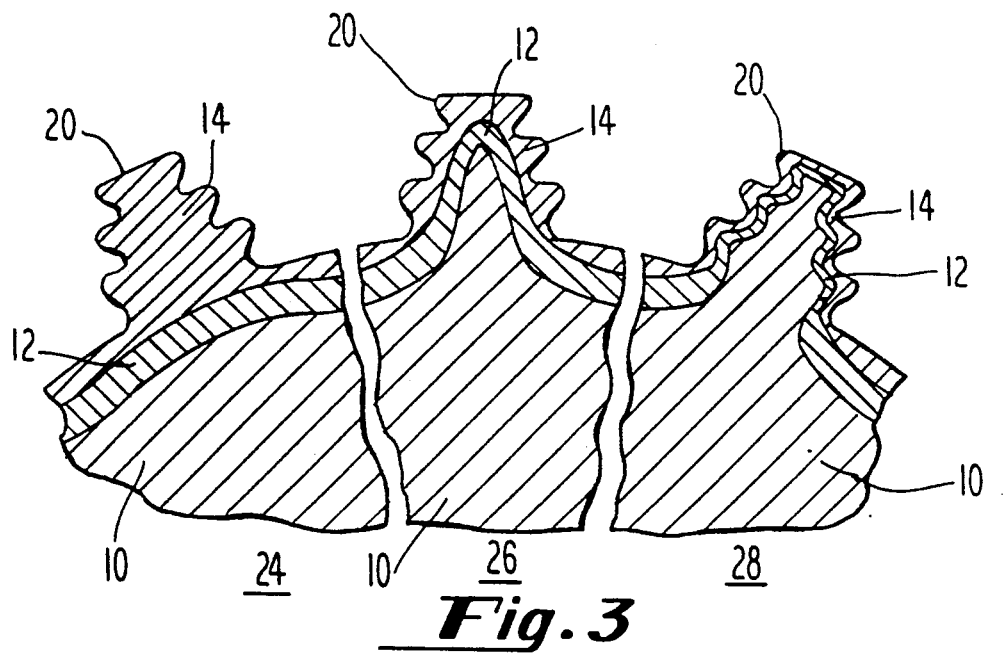
FIG. 3: are partial side views of three different machined rotor embodiments illustrating the portions of the steeple constructed from both the steeple region and the graded layer.

In one preferred embodiment shown in FIG. 1, the stainless steel "steeple region", the general region of the rotor disc which comprises one or more steeples, includes a weld build-up welded to the graded weld 12 so that the graded weld 12 extends into the final machined steeple 20, as illustrated in steeple design 24 of FIG. 3. In design 24, the steeple alloy 14 has adequate or superior mechanical properties to the base metal 10. Simplicity in welding is optimized by circular welding profiles in this example. When the base metal 10 has some superior metallurgical properties over the steeple alloy 14, steeple design 26 may be the more appropriate choice. In this form, the base metal 10 is extended into the steeple and the graded weld 12 is thinner, losing some of its ability to confer corrosion resistance over long distances. When the steeple alloy metallurgical properties are generally inferior to the base metal 10 properties it may be more appropriate to make the graded weld 12 even thinner as shown in steeple design 28. In this embodiment the graded weld 12 generally conforms with the shape of the final dimensions of the machined steeple 20.

Figure 2:
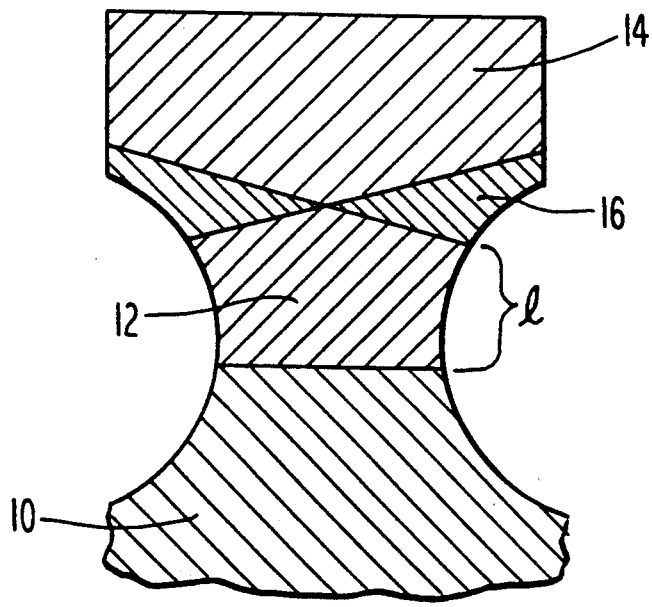
FIG. 2: is a cross-sectional view of another rotor embodiment illustrating a ring member having a graded layer of weldments thereon and combined with a fabricated steeple region by a separate weldment.

In an alternative embodiment of the invention, illustrated in FIG. 2, a stainless steel steeple alloy 14 in bulk alloy form is joined with a joining weld 16 to graded layer 12. In each of the above embodiments, the graded weld 12 can be shaped to give a good starting configuration prior to applying the steeple alloy 14.

It should be noted that for reasonable resistance to corrosion, the graded layer of weldments should be on the order of 1.25 cm in length "l" or greater, preferably greater than about 2.5 cm for separating the low alloy ring member 10 from the preferred stainless steel steeple portion 14. If the thickness of the graded layer 12 were too small, a water droplet, hence corrosion cell, is likely to be able to span a wide range of compositions and develop a corrosion situation.

Figure 4:
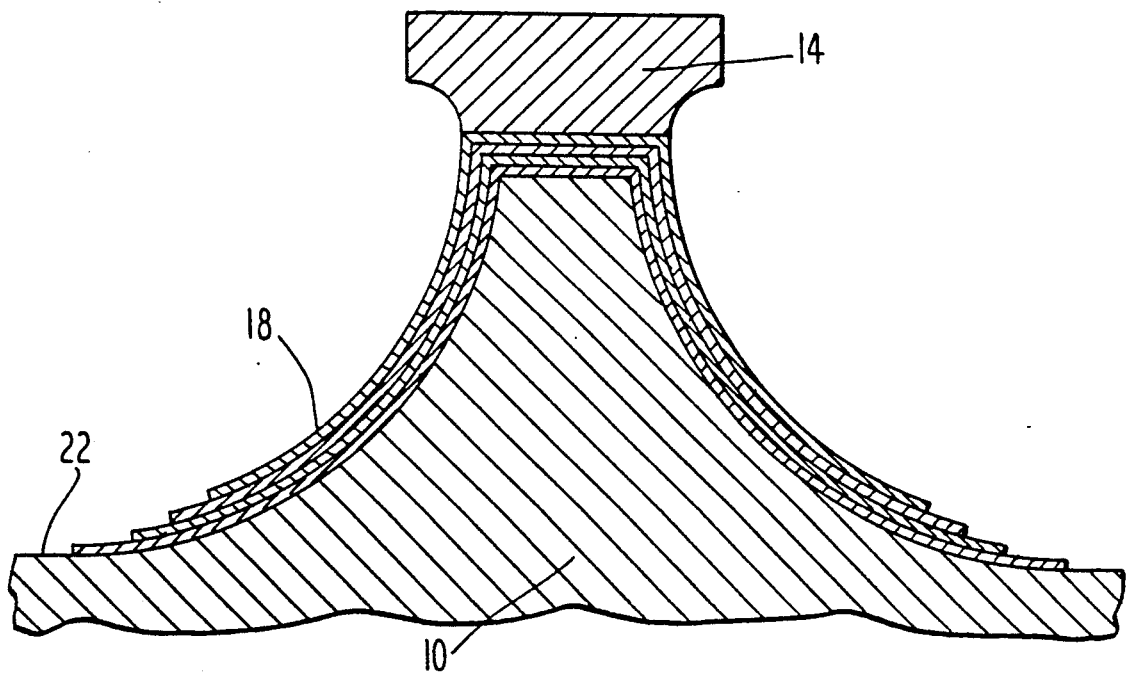
FIG. 4: is a partial cross-sectional view of another rotor embodiment illustrating how the graded weld can be extended onto the disc in stepped layers to protect the disc from wear and corrosion.

Referring now to FIG. 4, there is shown a "stepped" approach to reducing corrosion by protecting the body of the rotor disc in critical areas. Each weld includes a different concentration of a Cr-containing layering alloy or stainless steel and can be terminated in a stepped fashion to increase the distance from the stainless steel steeple alloy 14 from the low alloy base metal 10. The steps 18 should be long enough so that the distance from the exposed base alloy 22 to the stainless steel steeple alloy 14 is longer than the largest water region. The thickness of the steps of graded coatings is not critical, however complete coverage of the low alloy ring member as described in FIG. 3 is preferred. In such an instance, a stainless steel finishing layer could be deposited, which should be thicker than the lower layers, to allow for minor surface damage without penetration to the lower, more easily corroded layers.

Alternatively, the lower portion of the low alloy ring member 10 can be coated with one, or possibly a few, high stainless steel concentration layers to provide a protective cladding. This configuration would be easier to construct, but would be more susceptible to corrosion if the stainless steel cladding layer were penetrated.

The foregoing establishes that this invention provides improved repair and original equipment manufacturing procedures for applying steeple portions having optimized wear properties to discs of steam turbine and generator rotors. The welding techniques described herein produce a graded or gradual compositional change between a preferred stainless steel steeple portion and a low allow rotor portion so as to minimize localized corrosive attacks. Although various embodiments have been illustrated, this was for the purpose of describing, and not limiting the invention. Various modifications, which will become apparent to one skilled in the art, are within the scope of this invention are described in the attached claims.

We claim:

1. A steam turbine component comprising:
   (a) a ring member comprising a low alloy ferrous base metal having less than about 6 wt. % alloying ingredients including Cr, Mo and V;
   (b) a ferrous graded layer disposed on said ring member comprising a plurality of layered weldments in which there is disposed an increasing weight percentage of a layering metal containing Cr; and
   (c) a steeple region including a Cr-containing steeple alloy disposed on said graded layer for optimizing a life extending property of said steeple region of the turbine component.

2. The steam turbine component of claim 1 in which said base metal further contains Ni.

3. The steam turbine component of claim 1 wherein said base metal comprises low alloy steel.

4. The steam turbine component of claim 3 wherein said layered weldments comprise gas tungsten arc weldments.

5. The steam turbine component of claim 4 wherein said layering metal comprises Ni.

6. The steam turbine component of claim 5 in which said layering metal comprises a stainless steel.

7. The steam turbine component of claim 6 in which said stainless steel comprises an austenitic stainless steel.

8. The steam turbine component of claim 6 in which said graded layer comprises a thickness of greater than about 1.25 cm.

9. The steam turbine component of claim 6 in which said graded layer comprises a thickness of greater than about 2.5 cm.

10. The steam turbine component of claim 6 in which said steeple region comprises a plurality of layered stainless steel weldments.

11. The steam turbine component of claim 6 in which said steeple region comprises a wear resistant metal.

12. The steam turbine component of claim 1, wherein said graded layer comprises a graded weld which extends into said steeple region.

13. The steam turbine component of claim 12, wherein said graded weld generally conforms to the shape of a machined steeple.

14. A steam turbine rotor disc comprising:

(a) a ring member comprising a low alloy steel having less than about 6 wt. % alloying ingredients including Cr, Mo and V;

(b) a graded layer of weldments disposed on said ring member, said layer containing an increasing weight percentage of stainless steel; and (c) a steeple region containing a Cr-containing steeple alloy disposed on said graded layer, said graded layer having a thickness greater than about 1.25 cm for minimizing corrosion between said ring member and said steeple region.

15. A method of preparing a steam turbine rotor for optimizing a life extending property of a steeple region of said rotor, comprising:

(a) providing a ring member comprising a low alloy ferrous base metal having less than about 6 wt. % alloying ingredients including Cr, Mo and V;

(b) disposing a ferrous graded layer onto said ring member, said ferrous graded layer comprising a plurality of layered weldments in which there is disposed an increasing weight percentage of a layering metal containing Cr;

(c) providing a steeple region including a Cr-containing steeple material disposed on said graded layer.

16. The method of claim 15 wherein said base metal comprises Ni.

17. The method of claim 16 in which said graded layer comprises stainless steel.

18. The method of claim 17 in which said disposing step (b) comprises gas tungsten arc welding said plurality of layered weldments.

19. The method of claim 18 in which said welding step comprises disposing a varying weight percentage of stainless steel within said layered weldments.

20. The method claim 19 in which said welding step comprises disposing consecutive weldments having a difference in a weight percentage of stainless steel of greater than about 1 wt. %.

21. The method of claim 19 of which said welding step comprises disposing consecutive weldments having a difference in a weight percentage of stainless steel greater than about 3 wt. %.

22. A method of preparing a steam turbine rotor for optimizing a life extending property of a steeple region of said rotor without creating a significant electrochemical corrosion cell, comprising:

(a) providing a ring member comprising a low alloy steel having less than about 6 wt. % alloying ingredients including Cr, Mo and V;

(b) welding a graded layer onto said ring member, said graded layer comprising a plurality of layered weldments in which there is disposed an increasing weight percentage of stainless steel;

(c) welding a steeple region containing Cr onto said graded layer;

wherein said graded layer has a thickness of at least about 1.25 cm for minimizing corrosion between said steeple region and said ring member during service.

* * * * *